(12) United States Patent
Saylor et al.

(10) Patent No.: US 10,619,735 B2
(45) Date of Patent: Apr. 14, 2020

(54) SYSTEMS FOR HYDRAULIC ENERGY DELIVERY

(71) Applicant: GM GLOBAL TECHNOLOGY OPERATIONS LLC, Detroit, MI (US)

(72) Inventors: Brian K. Saylor, South Lyon, MI (US); Matthew G. Kowal, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 98 days.

(21) Appl. No.: 15/964,533

(22) Filed: Apr. 27, 2018

(65) Prior Publication Data
US 2019/0331218 A1 Oct. 31, 2019

(51) Int. Cl.
| | |
|---|---|
| F16H 61/425 | (2010.01) |
| B60K 6/12 | (2006.01) |
| B60G 17/015 | (2006.01) |
| B60G 99/00 | (2010.01) |
| F15B 1/02 | (2006.01) |

(52) U.S. Cl.
CPC ....... *F16H 61/425* (2013.01); *B60G 17/0157* (2013.01); *B60G 99/002* (2013.01); *B60K 6/12* (2013.01); *F15B 1/024* (2013.01)

(58) Field of Classification Search
CPC . F16H 61/425; B60G 17/0157; B60G 99/002; B60K 6/12; F15B 1/024
See application file for complete search history.

(56) References Cited

U.S. PATENT DOCUMENTS

| | | | | |
|---|---|---|---|---|
| 3,681,629 A | * | 8/1972 | Drye | H02K 41/025 310/14 |
| 5,028,073 A | * | 7/1991 | Harms | B60G 13/14 280/5.501 |
| 5,301,111 A | * | 4/1994 | Utsui | B60G 17/0157 701/37 |
| 2010/0187031 A1 | * | 7/2010 | Waszak | B60L 11/02 180/65.265 |

* cited by examiner

*Primary Examiner* — Bryan A Evans
(74) *Attorney, Agent, or Firm* — Quinn IP Law

(57) ABSTRACT

An exemplary energy delivery system includes a housing. The housing includes a linear motor including a translational member and an electromagnetic field generating member. Energization of the electromagnetic field generating member induces translation of the translational member along a longitudinal axis of the linear motor. The housing further includes a first cylinder including a first chamber and a movable first piston and a second cylinder including a second chamber and a movable second piston. The first and second cylinders are coupled in-line with the linear motor within the housing and translation of the translational member along the longitudinal axis translates the first piston within the first chamber in a first direction and translates the second piston within the second chamber in a second direction opposite the first direction.

17 Claims, 2 Drawing Sheets

SYSTEMS FOR HYDRAULIC ENERGY DELIVERY

INTRODUCTION

The present invention relates generally to the field of vehicles and, more specifically, to systems for hydraulic energy delivery using a linear electric motor and one or more directly coupled hydraulic cylinders.

Some vehicles are equipped with active or semi-active vehicle suspension systems that control the vertical movement of the vehicle body relative to the wheels with an onboard system of actuators configured to raise and lower the body independently at each wheel. Typically, these suspension systems utilize electrically-driven pumps and delivery systems that are speed and/or force limited.

SUMMARY

Embodiments according to the present disclosure provide a number of advantages. For example, embodiments according to the present disclosure enable active control of a system, such as a suspension system, using one or more hydraulic cylinders driven by an electric linear motor. Directly coupling one or more hydraulic cylinders to a linear electric motor enables force delivery on demand, which is used, in some embodiments, in active suspension control.

In one aspect, an energy delivery system includes a housing. The housing encloses a linear motor including a translational member and an electromagnetic field generating member, and energization of the electromagnetic field generating member induces translation of the translational member along a longitudinal axis of the linear motor; a first hydraulic cylinder including a first chamber and a movable first piston, the first chamber enclosing a hydraulic fluid; and a second hydraulic cylinder including a second chamber and a movable second piston, the second chamber enclosing a hydraulic fluid. The first and second hydraulic cylinders are coupled in-line with the linear motor within the housing and translation of the translational member along the longitudinal axis translates the first piston within the first chamber in a first direction and translates the second piston within the second chamber in a second direction such that the first and second pistons act on the hydraulic fluid enclosed within the first and second hydraulic cylinders to change an amount of hydraulic fluid contained in each of the first and second hydraulic cylinders.

In some aspects, the energy delivery system includes a controller.

In some aspects, the controller generates a control signal indicative of an adjustment of a position of the translational member such that the position adjustment adjusts a suspension dynamics setting of a vehicle.

In some aspects, the first hydraulic cylinder is coupled to a first suspension component of a vehicle and the second hydraulic cylinder is coupled to a second suspension component of a vehicle.

In some aspects, the first and second pistons are integral with the translational member of the linear motor.

In some aspects, the second direction is opposite the first direction such that a volume of the first chamber increases when a volume of the second chamber decreases.

In another aspect, an automotive vehicle includes a suspension system including an adjustable suspension component, an energy delivery system coupled to the adjustable suspension component, and a controller. The energy delivery system includes a housing, the housing including a linear motor including a translational member and an electromagnetic field generating member, wherein energization of the electromagnetic field generating member induces translation of the translational member along a longitudinal axis of the linear motor; a first cylinder including a first chamber and a movable first piston; and a second cylinder including a second chamber and a movable second piston. The controller is in electronic communication with the energy delivery system. The first and second cylinders are coupled in-line with the linear motor within the housing and translation of the translational member along the longitudinal axis translates the first piston within the first chamber in a first direction and translates the second piston within the second chamber in a second direction such that the adjustable suspension component is adjusted from a first position to a second position.

In some aspects, the first chamber encloses a hydraulic fluid and the second chamber encloses a compressible member.

In some aspects, the compressible member is a spring coupled on one end to the second piston.

In some aspects, each of the first and second chambers encloses a hydraulic fluid.

In some aspects, the controller is in electronic communication with the linear motor and transmits a control signal to the linear motor to adjust a position of the translational member.

In some aspects, the control signal indicates a change in a selective energization of the electromagnetic field generating member.

In yet another aspect, an energy delivery system includes a housing, the housing including a linear motor including a translational member and an electromagnetic field generating member, wherein energization of the electromagnetic field generating member induces translation of the translational member along a longitudinal axis of the linear motor; a first cylinder including a first chamber and a movable first piston, the first chamber enclosing a hydraulic fluid; and a second cylinder including a second chamber and a movable second piston. The first and second cylinders are coupled in-line with the linear motor within the housing and translation of the translational member along the longitudinal axis translates the first piston within the first chamber in a first direction and translates the second piston within the second chamber in a second direction such that the first and second pistons act on the hydraulic fluid enclosed within the first cylinder to change an amount of hydraulic fluid contained in the first cylinder.

In some aspects, the first and second pistons are integral with the translational member of the linear motor.

In some aspects, the second direction is opposite the first direction such that a volume of the first chamber increases when a volume of the second chamber decreases.

In some aspects, the first chamber encloses a hydraulic fluid and the second chamber encloses a compressible member.

In some aspects, the compressible member is a spring coupled on one end to the second piston.

In some aspects, the energy delivery system includes a controller.

In some aspects, the controller generates a control signal indicative of an adjustment of a position of the translational member such that the position adjustment adjusts a suspension dynamics setting of a vehicle.

In some aspects, the first cylinder is coupled to a first suspension component of a vehicle and the second cylinder is coupled to a second suspension component of a vehicle.

BRIEF DESCRIPTION OF THE DRAWINGS

The present disclosure will be described in conjunction with the following figures, wherein like numerals denote like elements.

Figure 1:
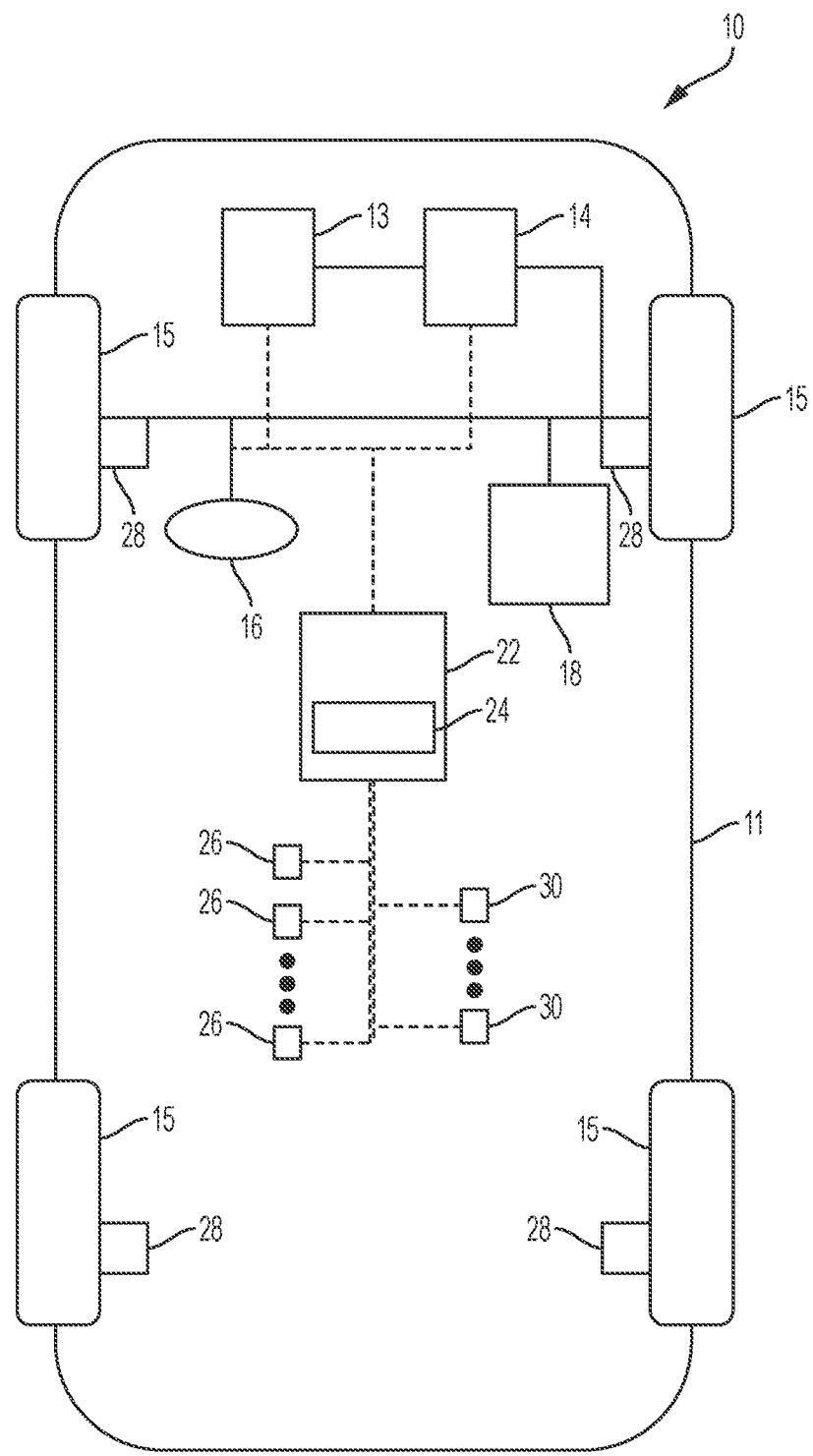
FIG. 1 is a schematic diagram of a vehicle having an energy delivery system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout this disclosure, similar reference numbers refer to similar components.

FIG. 1 schematically illustrates an automotive vehicle 10 according to the present disclosure. The vehicle 10 generally includes a body 11 and wheels 15. The body 11 encloses the other components of the vehicle 10. The wheels 15 are each rotationally coupled to the body 11 near a respective corner of the body 11. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission. The vehicle 10 additionally includes wheel brakes (not shown) configured to provide braking torque to the vehicle wheels 15. The wheel brakes may, in various embodiments, include friction brakes, a regenerative braking system such as an electric machine, and/or other appropriate braking systems. The vehicle 10 additionally includes a steering system 16. While depicted as including a steering wheel and steering column for illustrative purposes, in some embodiments, the steering system 16 may not include a steering wheel.

The vehicle 10 also includes a suspension system 18. The suspension system 18 includes a plurality of suspension components including, for example and without limitation, dampers, shock absorbers, sway bar linkages, etc. that may be mounted adjacent to the wheels 15. In some embodiments, the suspension system 18 is an active or semi-active suspension system. An active suspension is a type of automotive suspension that controls the vertical movement of the wheel relative to the chassis or vehicle body with an onboard system. Active or semi-active suspension systems can vary shock absorber firmness to match changing road or dynamic conditions or use an actuator to raise and lower the chassis independently at each wheel. In some embodiments, the suspension system 18 includes one or more suspension components, such as the suspension components 28. In some embodiments, as shown in FIG. 1, a suspension component 28 is positioned adjacent to each of the wheels 15. In some embodiments, the suspension component 28 is a vehicle damper. In some embodiments, the vehicle 10 includes other actively-controlled suspension components, such as a sway bar linkage, etc., for example and without limitation.

With further reference to FIG. 1, the vehicle 10 also includes a plurality of sensors 26 configured to measure and capture data on one or more vehicle characteristics, including but not limited to vehicle speed, vehicle heading, and suspension displacement. In the illustrated embodiment, the sensors 26 include, but are not limited to, an accelerometer, a speed sensor, a heading sensor, gyroscope, steering angle sensor, or other sensors that sense observable conditions of the vehicle or the environment surrounding the vehicle and may include RADAR, LIDAR, optical cameras, thermal cameras, ultrasonic sensors, infrared sensors, light level detection sensors, and/or additional sensors as appropriate. In some embodiments, the vehicle 10 also includes a plurality of actuators 30 configured to receive control commands to control steering, shifting, throttle, braking, suspension dynamics, or other aspects of the vehicle 10.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

Typically, adjustments to active suspension system components, such as the components 28, are enabled by electrically-driven pumps and delivery systems that are speed and/or force limited. The systems discussed herein allow efficient fluid volume and/or force delivery to active suspension system components using linear motors coupled with one or more hydraulic drive cylinders.

Figure 2:
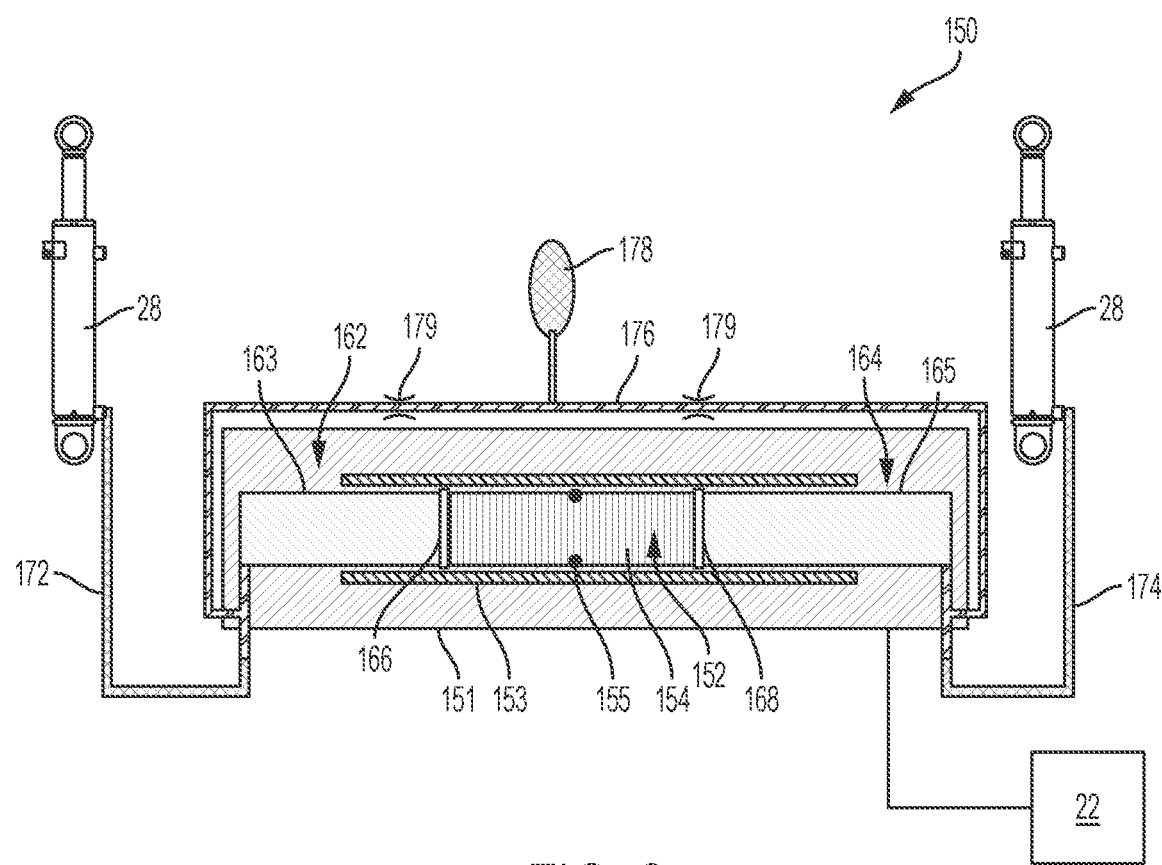
FIG. 2 is a schematic diagram of an energy delivery system, according to an embodiment.

FIG. 2 is a schematic illustration of an energy delivery system 150, according to an embodiment. In some embodiments, the energy delivery system 150 is integrated with or physically and/or electronically connected to the suspension system 18 of the vehicle 10. The energy delivery system 150 includes a housing 151. The housing 151 encloses a linear motor 152 and first and second hydraulic cylinders 162, 164.

As is known to those skilled in the art, the linear motor 152 is a linear induction motor. The linear motor 152 includes electromagnets 153 surrounding a translational member 154. Translational motion of the translational member 154 is driven by changes to an electromagnetic field generated by the electromagnets 153 that encircle the translational member 154. Selective energization of the electromagnets 153 generates a direct translational movement of the translational member 154 that can be used to provide a discrete and precise adjustment to the position of one or more pistons within one or more directly-mounted, inline hydraulic cylinders, for example and without limitation.

In the embodiment shown in FIG. 2, the linear motor 152 is longitudinally positioned between two hydraulic cylinders 162, 164. A longitudinal axis of each of the hydraulic cylinders 162, 164 is aligned with the longitudinal axis of the linear motor 152. Each of the hydraulic cylinders 162, 164 includes a cylinder chamber 163, 165. The cylinder chambers 163, 165 each enclose hydraulic fluid. Activation of the linear motor 152 causes the translational member 154 to act as a piston on the hydraulic fluid enclosed within the chambers 163, 165. Piston faces 166, 168 are integral with or coupled to the translational member 154. The piston faces 166, 168 travel longitudinally within the chambers 163, 165 to displace the hydraulic fluid enclosed within. A sealing member 155 separates the two chambers 163, 165 of the hydraulic cylinders 192, 194.

Hydraulic lines 172, 174 connect the chambers 163, 165 with hydraulic chambers of the components 28. The components 28 are part of the suspension system 18 of the vehicle 10. In some embodiments, a hydraulic line 176 and an accumulator 178 connect the chambers 163, 165 to provide load balance to the energy delivery system 150. In some embodiments, one or more valves 179 assist to regulate the flow between the chambers 163, 165 and bleed the system 150 of air.

The energy delivery system 150 is in electrical communication with a controller, such as the controller 22. In some embodiments, as shown in FIG. 2, the energy delivery system 150 is used to provide active roll control for a vehicle suspension system, such as the suspension system 18 of the vehicle 10. In some embodiments, the linear motor 152 receives a control signal from the controller 22. The control signal represents a desired change in an active suspension setting, such as active roll control, and selectively energizes the electromagnets 153 to move translational member 154 in the desired direction(s) to adjust a suspension dynamics setting of each of the components 28.

The translational member 154 travels longitudinally either left or right (as viewed in FIG. 2) in response to the control signal received from the controller 22. As the translational member 154 travels from left to right, the volume of the chamber 165 is decreased and the volume of the chamber 163 is increased. Hydraulic fluid in the chamber 165 is transferred to the component 28 via the hydraulic line 174 and simultaneously hydraulic fluid is drawn from the other component 28 to adjust a suspension dynamics setting of the components 28. Similarly, as the translational member 154 the linear motor 152 travels from right to left, the volume of the chamber 163 is decreased and the volume of the chamber 165 is increased. Hydraulic fluid in the chamber 163 is transferred to the component 28 via the hydraulic line 172 while the increased volume of the chamber 165 draws hydraulic fluid from the other component 28. As a result of the linear translation of the linear motor 152, adjustment of both of the components 28 is affected to provide active roll control of the vehicle 10.

Figure 3:
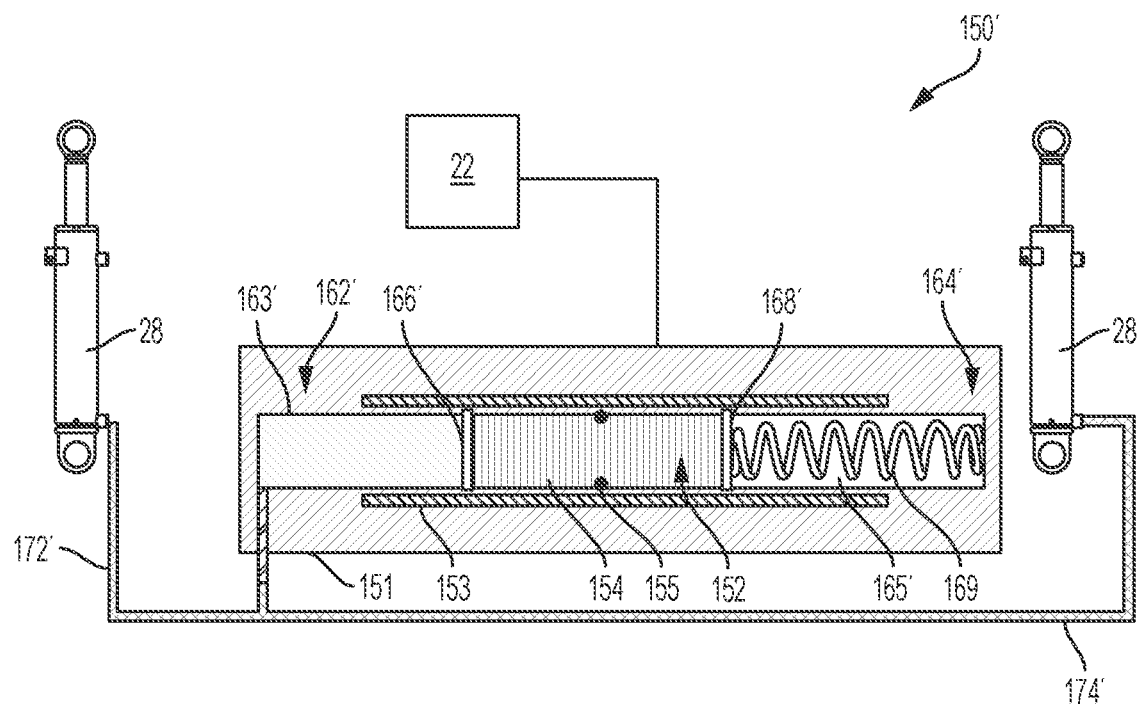
FIG. 3 is a schematic diagram of an energy delivery system, according to another embodiment.

FIG. 3 illustrates an energy delivery system 150', according to an embodiment. In some embodiments, the energy delivery system 150' is part of the suspension system 18 of the vehicle 10. The energy delivery system 150' includes a housing 151. The housing 151 encloses a linear motor 152, a hydraulic cylinder 162', and a mechanical cylinder 164'.

In the embodiment shown in FIG. 3, the linear motor 152 is longitudinally positioned between the hydraulic cylinder 162' and the mechanical cylinder 164'. The hydraulic cylinder 162' includes a chamber 163' and the mechanical cylinder 164' includes a chamber 165'. The cylinder chamber 163' encloses hydraulic fluid. The chamber 165' encloses a compressive member or fluid that provides energy balance to the system 150. In one embodiment, the chamber 165' encloses a compressive member 169. In some embodiments, the compressive member 169 is a spring, for example and without limitation. In other embodiments, the chamber 165' encloses air or any other compressible fluid that exerts a force against the piston face 168' to balance the force exerted by the hydraulic fluid on the piston face 166'. Piston faces 166', 168' travel longitudinally within the chambers 163, 165 to displace the hydraulic fluid enclosed within the chamber 163' and exert either a compressive or tensile force on the compressive member or fluid within the chamber 165'. A sealing member 155 separates the two chambers 163', 165'.

Hydraulic lines 172', 174' connect the chamber 163' with the hydraulic chambers of the components 28. The components 28 are part of the suspension system 18 of the vehicle 10. In some embodiments, the components 28 are vehicle dampers or any other suspension component that assists to adjust a ride height of the vehicle 10.

The energy delivery system 150' is in electrical communication with a controller, such as the controller 22. In some embodiments, as shown in FIG. 3, the energy delivery system 150' is used to provide ride height control for a vehicle suspension system, such as the suspension system 18 of the vehicle 10. In some embodiments, the linear motor 152 receives a control signal from the controller 22. The control signal represents a desired change in an active suspension setting, such as a ride height adjustment.

The linear motor 152 travels longitudinally either left or right (as viewed in FIG. 3) in response to the control signal received from the controller 22. As the translational member 154 of the linear motor 152 travels from left to right, the volume of the chamber 165' is decreased and the volume of the chamber 163' is increased. As the compressive member 169 compresses in response to the force applied by the linear motor 152, hydraulic fluid is redistributed in the chamber 163' and the components 28 via the lines 172', 174' to adjust a vehicle ride height. Similarly, as the translational member 154 of the linear motor 152 travels from right to left, the volume of the chamber 163' is decreased and the volume of the chamber 165' is increased. Hydraulic fluid in the chamber 163' is transferred to the components 28 via the hydraulic lines 172', 174'. As a result of the linear translation of the linear motor 152, adjustment of both of the components 28 is affected to provide active roll control of the vehicle 10.

While FIGS. 2 and 3 illustrate two configurations of a linear motor coupled to one or more hydraulic cylinders. However, other configurations, such as the placement and orientation of the hydraulic cylinder(s) and/or a compressive member are contemplated as within the scope of the embodiments discussed herein. Additionally, while discussed in the context of an active suspension system, the energy delivery system may be used for any application in which discrete adjustment of one or more components is desired.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1" and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An energy delivery system, comprising:
a housing, the housing including
a linear motor including a translational member and an electromagnetic field generating member, wherein energization of the electromagnetic field generating member induces translation of the translational member along a longitudinal axis of the linear motor;
a first hydraulic cylinder including a first chamber and a movable first piston, the first chamber enclosing a hydraulic fluid;
a second hydraulic cylinder including a second chamber and a movable second piston, the second chamber enclosing a hydraulic fluid; and
a controller in communication with the linear motor;
wherein the first and second hydraulic cylinders are coupled with the linear motor within the housing and translation of the translational member along the longitudinal axis translates the first piston within the first chamber in a first direction and translates the second piston within the second chamber in a second direction such that the first and second pistons act on the hydraulic fluid enclosed within the first and second hydraulic cylinders to change an amount of hydraulic fluid contained in each of the first and second hydraulic cylinders and the controller generates a control signal indicative of a position adjustment of the translational member such that the position adjustment adjusts a suspension dynamics setting of a vehicle.

2. The energy delivery system of claim 1, wherein the first hydraulic cylinder is coupled to a first suspension component of a vehicle and the second hydraulic cylinder is coupled to a second suspension component of a vehicle.

3. The energy delivery system of claim 1, wherein the first and second pistons are integral with the translational member of the linear motor.

4. The energy delivery system of claim 3, wherein the second direction is opposite the first direction such that a volume of the first chamber increases when a volume of the second chamber decreases.

5. An automotive vehicle, comprising:
a suspension system including an adjustable suspension component;
an energy delivery system coupled to the adjustable suspension component, the energy delivery system comprising
a housing, the housing including
a linear motor including a translational member and an electromagnetic field generating member, wherein energization of the electromagnetic field generating member induces translation of the translational member along a longitudinal axis of the linear motor;
a first cylinder including a first chamber and a movable first piston; and
a second cylinder including a second chamber and a movable second piston; and
a controller in electronic communication with the energy delivery system;
wherein the first and second cylinders are coupled in-line with the linear motor within the housing and translation of the translational member along the longitudinal axis translates the first piston within the first chamber in a first direction and translates the second piston within the second chamber in a second direction such that the adjustable suspension component is adjusted from a first position to a second position.

6. The automotive vehicle of claim 5, wherein the first chamber encloses a hydraulic fluid and the second chamber encloses a compressible member.

7. The automotive vehicle of claim 6, wherein the compressible member is a spring coupled on one end to the second piston.

8. The automotive vehicle of claim 5, wherein each of the first and second chambers encloses a hydraulic fluid.

9. The automotive vehicle of claim 5, wherein the controller is in electronic communication with the linear motor and transmits a control signal to the linear motor to adjust a position of the translational member.

10. The automotive vehicle of claim 9, wherein the control signal indicates a change in a selective energization of the electromagnetic field generating member.

11. An energy delivery system, comprising:
a housing, the housing including
a linear motor including a translational member and an electromagnetic field generating member, wherein energization of the electromagnetic field generating member induces translation of the translational member along a longitudinal axis of the linear motor;
a first cylinder including a first chamber and a movable first piston, the first chamber enclosing a hydraulic fluid; and
a second cylinder including a second chamber and a movable second piston;
wherein the first cylinder is coupled to a first suspension component of a vehicle and the second cylinder is coupled to a second suspension component of the vehicle and the first and second cylinders are coupled with the linear motor within the housing and translation of the translational member along the longitudinal axis translates the first piston within the first chamber in a first direction and translates the second piston within the second chamber in a second direction such that the first and second pistons act on the hydraulic fluid enclosed within the first cylinder to change an amount of hydraulic fluid contained in the first cylinder.

12. The energy delivery system of claim 11, wherein the first and second pistons are integral with the translational member of the linear motor.

13. The energy delivery system of claim 12, wherein the second direction is opposite the first direction such that a volume of the first chamber increases when a volume of the second chamber decreases.

14. The energy delivery system of claim 11, wherein the first chamber encloses the hydraulic fluid and the second chamber encloses a compressible member.

15. The energy delivery system of claim 14, wherein the compressible member is a spring coupled on one end to the second piston.

16. The energy delivery system of claim 11, wherein the energy delivery system includes a controller.

17. The energy delivery system of claim 16, wherein the controller generates a control signal indicative of an adjustment of a position of the translational member such that the position adjustment adjusts a suspension dynamics setting of a vehicle.

* * * * *